April 10, 1934.　　A. H. HEYROTH ET AL　　1,954,128

HEATING APPLIANCE

Filed Jan. 2, 1932

INVENTORS
ALBERT H. HEYROTH
BY EDWARD W. BRATTON

ATTORNEY

Patented Apr. 10, 1934

1,954,128

UNITED STATES PATENT OFFICE 1,954,128

HEATING APPLIANCE

Albert H. Heyroth and Edward W. Bratton, Niagara Falls, N. Y., assignors to The Globar Corporation, Niagara Falls, N. Y., a corporation of New York Application January 2, 1932, Serial No. 584,420

5 Claims. (Cl. 219—37)

This invention relates to improvements in heating devices of the type used in electric ranges.

An object of the invention is to provide a heating device which will direct a maximum amount of input energy to the object to be heated and which will disperse the radiation uniformly over a definite heating surface.

Heretofore, heating devices such as hot plates (which contain rigid resistors) have usually employed a plurality of elements in order to imitate the relatively uniform heat distribution obtained by spreading a metallic heating element in the form of a spiral or grid over the entire surface of the plate. Such a design requires considerable refractory material and a corresponding amount of heat insulating material, which materials absorb large portions of the input energy. Reflector type designs have been characterized by non-uniform heat distribution. In the course of operation reflector surfaces become dirty, thereby absorbing more heat and therefore reducing the efficiency of the appliance.

This invention is designed to overcome the difficulties just mentioned. The attached drawing illustrates the novel features of our combined reflector and cover heating appliance.

Figure 1:
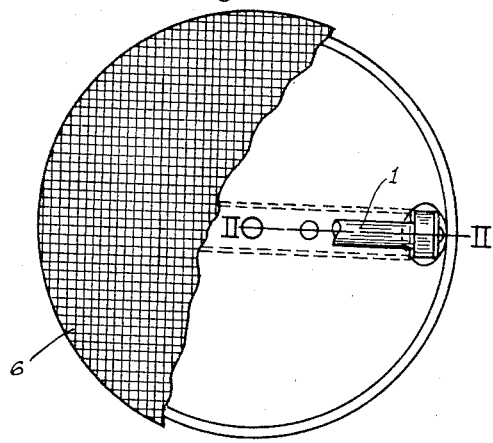
Figure 1 is a plan view of the hot plate with the cover partially broken away.
Figure 2:
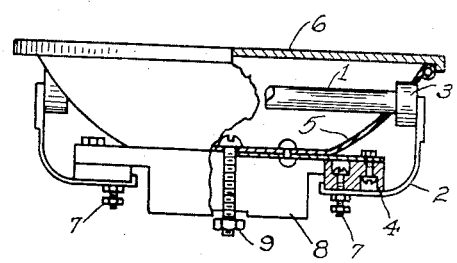
Figure 2 is an elevation, partly shown as a section on the line II—II of Figure 1.

Referring particularly to Figure 2, the heating element 1 is supported in its position by clipping it between two resilient contact members 2 each of which is provided with a contact button 3. These contacts provide butt-end terminal support and electrical connection for the rigid resistor. 8 is a block to which the terminal assemblies 2, 3 and 4 are attached. The terminals 7 for electrical connections to the heating element are indicated at 7 in the lower part of Figure 2.

A bowl-shaped metal piece has a flat bottom which reflects upwardly the downward and lateral radiation from the rigid resistor 1. This radiation is reflected in an upward direction over the plane area circumscribed by the rim of the bowl. This bowl may be formed from aluminum sheet, and the inner or reflecting surface may be provided with a special finish produced by surface treatment with nitric and hydrofluoric acid during the course of manufacture. This is known as a matte finish.

Figure 4:
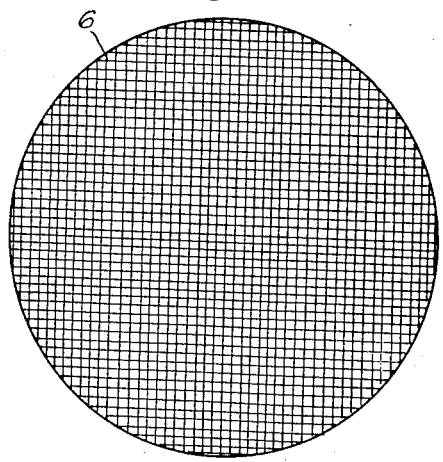
Figure 4 is a similar view of the opposite side.
Figure 3:
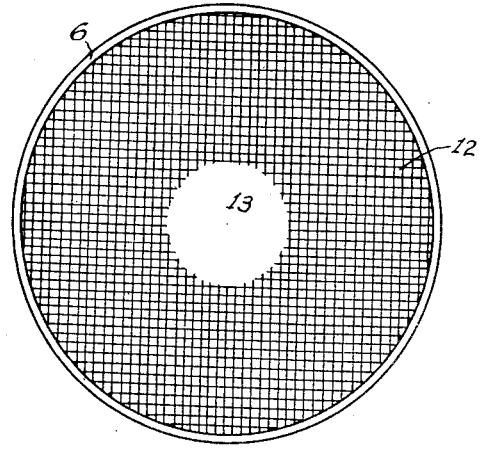
Figure 3 is a plan view showing the inner side of the hot plate cover.

Fitting loosely over the bowl is a plate 6 (Fig. 3 and Fig. 4) serving to cover the reflecting surface and heating mechanism and at the same time serving to protect the heating element and to equalize the temperature over the upper surface of the plate. In this modification the cover is made of aluminum blackened by anodic plating over its entire surface (inner and outer) with the exception of a circular area at the center of the inner surface 13. See Figures 3 and 4. The area 13 is left bright so as to constitute a reflector rather than an absorber of heat.

We have been able in this combination of units to provide the hot plate with certain new and novel features heretofore unrealized. This hotplate functions by means of the cooperation of a primary radiator (rigid resistor 1), the reflector bowl 5 and the secondary radiator cover 6, the remainnig radiant heat going first to the reflector 5 and thence to the cover. The reflector 5 reflects and therefore disperses part of energy onto the secondary radiator 6. Thus in this novel manner the concentrated energy delivered by the heating element is dispersed uniformly over the entire heating area of the hot-plate without excessively heating any part to the extent of destroying it.

The first step in the dispersion of heat is performed by the reflector 5 in that it transmits the heat with substantial uniformity over the area of the cover, the downward and sidewise radiation of the element being reflected upwardly to the cover. The reflector also conducts part of the energy which it absorbs to the rim of cover 6. The second and final step in the dispersion is performed by the cover by virtue of the material of which it is composed and the manner in which it is finished. That is to say, the high thermal conductivity of the metal mitigates against temperature gradients throughout the mass of the cover so that substantial uniformity of temperature is produced therein. The bright area at the center of the inner surface of the cover is a poor absorber of radiant heat and therefore tends to prevent excessive temperatures in that portion of outer area or radiating surface of the cover which lies directly opposite to 13. The blackened inner area of the cover 6 provides a good absorber of heat for the areas relatively remote from the heating element. Finally the black finish over the entire upper surface of the cover 6 provides rapid radiation which is so necessary in using a material of low heat capacity. The applicants have found that the cover disclosed has advantages over a number of other forms of cover which were tried, e. g., in its resistance to buckling and to softening when subjected to radiation from an extended resistor rod below the cover. When the cover was made of a refractory metal like "Ascoloy", buckling and burning of the metal resulted. When a tight-fitting cover was tried and its lower surface was not darkened the aluminum reflector below the resistor softened. In the case of a tight-fitting aluminum cover whose lower surface was darkened (while the upper surface was not darkened), the cover softened. The particular form of aluminum cover disclosed by the applicants has been shown therefore to have important advantages not only in rapid heat transmission but in resistance to buckling and to more permanent change of shape. While aluminum has been especially mentioned above, silver has the advantage for use in this invention of a higher thermal conductivity than aluminum. It has about the same heat capacity as aluminum.

We have described the principle of operation of our invention with such details of construction as we now consider to give the best embodiment thereof; but we desire to have it understood that the apparatus shown is only illustrative and that the invention can be carried out by other means.

What we claim as new is:

1. A hot-plate comprising in combination a single silicon carbide resistor, a reflector having a matte surface situated below said resistor, and an aluminum cover situated above said resistor and having a blackened upper surface for radiating to objects to be heated and a lower surface whose central area is bright, while its remaining area is blackened to absorb the radiation which comes directly from the resistor and indirectly from the reflector, the lower bright area and the remaining blackened area being proportioned to substantially overcome the tendency of the unequally heated cover to buckle.

2. A hot plate comprising in combination a single self-sustaining resistor resiliently supported at its end, a bowl-shaped reflector of sheet aluminum surrounding said heating element except on its upper side, and an aluminum cover in the form of a plate which completes the enclosure of the heating element, said plate being supported on the rim of the reflector, the aluminum plate being covered with a refractory black coating except for a bright area centrally disposed on the lower side of the cover, the blackened and bright areas being proportioned to substantially prevent buckling of the cover when subjected to radiation from the resistor.

3. A hot plate comprising in combination a single self-sustaining resistor resiliently supported at its ends, a bowl-shaped reflector of sheet aluminum surrounding said heating element except on its upper side, and a cover which completes the enclosure of the heating element, said cover consisting of an aluminum plate blackened on its upper surface and over its lower surface except in the central portion and projecting over the rim of the reflector, the central and blackened areas being proportioned to substantially prevent buckling of the plate when subjected to radiation from the resistor.

4. The hot plate described in claim 2 in which the reflecting surface of the bowl is etched to scatter the radiation more uniformly over the lower surface of the cover.

5. An electric heater comprising a concentrated source of radiant heat extending parallel with and close to the upper face of the heater, a reflector surrounding the source of heat except on its upper side, and a unitary cover fitting closely over the edges of the reflector, said cover having on its lower side a central reflecting area while the remainder of the surface is strongly heat absorbent, the reflecting and absorbent areas being proportioned to substantially prevent buckling of the cover when heated.

ALBERT H. HEYROTH.
EDWARD W. BRATTON.